(12) United States Patent
Chen

(10) Patent No.: US 11,030,405 B2
(45) Date of Patent: Jun. 8, 2021

(54) METHOD AND DEVICE FOR GENERATING STATEMENT

(71) Applicant: BEIJING BYTEDANCE NETWORK TECHNOLOGY CO., LTD., Beijing (CN)

(72) Inventor: Xiaoshuai Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/021,644

(22) Filed: Sep. 15, 2020

(65) Prior Publication Data

US 2020/0410167 A1 Dec. 31, 2020

Related U.S. Application Data

(63) Continuation of application No. PCT/CN2020/078588, filed on Mar. 10, 2020.

(30) Foreign Application Priority Data

Mar. 12, 2019 (CN) .......................... 201910186120.8

(51) Int. Cl.
*G06F 40/279* (2020.01)
*G06F 40/166* (2020.01)
(Continued)

(52) U.S. Cl.
CPC .......... *G06F 40/279* (2020.01); *G06F 3/0482* (2013.01); *G06F 40/166* (2020.01); *G06N 3/0454* (2013.01); *G06N 3/08* (2013.01)

(58) Field of Classification Search
CPC .... G06F 40/279; G06F 40/166; G06F 3/0482; G06N 3/08; G06N 3/0454
(Continued)

(56) References Cited

U.S. PATENT DOCUMENTS

| 8,626,748 B2 | 1/2014 | McDougall |
| 2014/0068523 A1 | 3/2014 | Wei et al. |
| 2018/0011830 A1* | 1/2018 | Iida ........................ G06F 40/169 |

FOREIGN PATENT DOCUMENTS

| CN | 102063451 A | 5/2011 |
| CN | 103631929 A | 3/2014 |

(Continued)

*Primary Examiner* — Thierry L Pham
(74) *Attorney, Agent, or Firm* — BakerHostetler

(57) ABSTRACT

A method and a device for generating a statement are provided. An embodiment includes obtaining an input statement by a user over a terminal; determining at least one target position in the input statement; according to a target position in the at least one target position, determining a statement to be inserted from the input statement; based on the statement to be inserted, determining at least one candidate word to be inserted in the target position; inserting a candidate word in the at least one candidate word into the target position to obtain a candidate statement; and sending the candidate statement to the terminal of the user for display. The embodiment can make candidate statements displayed on the terminal of the user more diversified to assist the user to select an expected statement from candidate statements, thereby saving time of the user spending on manually inserting words.

18 Claims, 6 Drawing Sheets

(51) Int. Cl.
*G06F 3/0482* (2013.01)
*G06N 3/04* (2006.01)
*G06N 3/08* (2006.01)

(58) Field of Classification Search
USPC .............................................. 704/9
See application file for complete search history.

(56) References Cited

FOREIGN PATENT DOCUMENTS

| | | |
|---|---|---|
| CN | 103914569 A | 7/2014 |
| CN | 104090923 A | 10/2014 |
| CN | 104765811 A | 7/2015 |
| CN | 105338076 A | 2/2016 |
| CN | 105975492 A | 9/2016 |
| CN | 106096003 A | 11/2016 |
| CN | 106529148 A | 3/2017 |
| CN | 106557175 A | 4/2017 |
| CN | 107454180 A | 12/2017 |
| CN | 107463704 A | 12/2017 |
| CN | 107577807 A | 1/2018 |
| CN | 101158969 A | 4/2018 |
| CN | 108846037 A | 11/2018 |
| CN | 109344238 A | 2/2019 |
| CN | 109933217 A | 6/2019 |
| JP | 2014-044726 A | 3/2014 |

\* cited by examiner

METHOD AND DEVICE FOR GENERATING STATEMENT

CROSS-REFERENCE TO RELATED APPLICATION

The disclosure is a continuation of PCT application Ser. No. PCT/CN2020/078588, filed on Mar. 10, 2020, which claims the priority benefit of CN application Ser. No. 201910186120.8, filed on Mar. 12, 2019, and the entirety of the above-mentioned patent application will be hereby incorporated by reference herein and made a part of this specification.

TECHNICAL FIELD

The disclosure relates to a computer technical field, and more particularly to a method and a device for providing a statement.

BACKGROUND

At present, various applications such as some search applications and input method applications generally have an input recommendation function, which can complete contents to be input by a user with currently input contents of the user as prefix when the user input words into an input box for achieving a purpose of assisting the user to input. When contents input by the user are incomplete, the user can move the cursor to the incomplete position for manual supplement.

SUMMARY

Embodiments of the disclosure provide a method and a device for generating a statement.

In a first aspect, an embodiment of the disclosure provides a method for generating a statement. The method includes obtaining an input statement by a user over a terminal; determining at least one target position in the input statement; according to a target position in the at least one target position, determining a statement to be inserted from the input statement; based on the statement to be inserted, determining at least one candidate word to be inserted in the target position; inserting a candidate word in the at least one candidate word into the target position to obtain a candidate statement; and sending the candidate statement to the terminal of the user for display. The at least one target position is a position for inserting a word.

In some embodiments, determining at least one target position in the input statement comprises: separating words in the input statement to obtain a word list; determining a position before a first word in the word list, a position after a last word in the word list, and a position between adjacent words in a circumstance of the word list comprising at least two words as candidate positions; and determining at least one target position from the candidate positions.

In some embodiments, determining at least one target position from the candidate positions comprises: inputting the word list into a position estimation module which is pre-trained to obtain a probability value corresponding to each of the candidate positions; the probability value is configured for indicating a probability to insert a word into the candidate positions; and selecting at least one probability value in a descending order from probability values, and determining a candidate position corresponding to the at least one probability value as the target position.

In some embodiments, the position estimation module is pre-obtained by training based on follow steps of: obtaining a first training sample set; wherein the first training sample set comprises a sample word list and position label information to mark a candidate position in the sample word list; and utilizing a machine learning method, taking the sample word list comprised in first training samples in the first training sample set as an input of an initial module, taking the position label information respectively corresponding to words comprised in the sample word list as an expected output of the initial module, training the initial module to obtain the position estimation module.

In some embodiments, determining at least one target position in the input statement comprises: in response to determining an end operation of a cursor movement aiming at the input statement, determining a current position of a cursor as the target position.

In some embodiments, based on the statement to be inserted, determining at least one candidate word to be inserted in the target position comprises: in response to determining the statement to be inserted comprises a prefix statement and a suffix statement, utilizing a word insertion module which is predisposed, determining a word to be inserted between the prefix statement and the suffix statement as the at least one candidate word; in response to determining the statement to be inserted merely comprises the prefix statement, utilizing the word insertion module to determine at least one word to be inserted after the prefix statement as the at least one candidate word; and in response to determining the statement to be inserted merely comprises the suffix statement, utilizing the word insertion module to determine at least one word to be inserted before the suffix statement as the at least one candidate word.

In some embodiments, the word insertion module is a bidirectional Trie tree which is pre-constructed; the bidirectional Trie tree comprises a forward Trie tree and a backward Trie tree; the forward Trie tree is configured for determining a word to be inserted after the prefix statement based on the prefix statement; the backward Trie tree is configured for determining a word to be inserted before the suffix statement based on the suffix statement; determining a word to be inserted between the prefix statement and the suffix statement as the at least one candidate word comprises: determining a first word set consisting of the at least one word to be inserted after the prefix statement, and determining a second word set consisting of the at least one word to be inserted before the suffix statement; and determining words comprised in an intersection of the first word set and the second word set as the at least one candidate word.

In some embodiments, the bidirectional Trie tree is pre-constructed based on following steps of: obtaining a history input statement set; separating words in a history input statement in the history input statement set to obtain a history input word list; and utilizing the history input word list to construct the bidirectional Trie tree; the bidirectional Trie tree comprises nodes, and the nodes correspond to words in the history input word list.

In some embodiments, the word insertion module is a neural network model which is pre-trained; the neural network model comprises a prefix neural network model, a suffix neural network model and a data processing layer; the prefix neural network model is configured for determining feature data of the prefix statement; the suffix neural network model is configured for determining feature data of the suffix statement; the data processing layer is configured for processing the feature data to obtain the at least one candidate word to be inserted into the at least one target position.

In some embodiments, the neural network model is pre-constructed based on following steps of: obtaining a second training sample set; wherein the second training sample set comprises a sample prefix statement and a sample suffix statement, and a sample insertion word predisposed to be inserted between the sample prefix statement and the sample suffix statement; utilizing a machine learning method, inputting the sample prefix statement comprised in second training samples in the second training sample set into the prefix neural network model to obtain first feature data, and inputting the sample suffix statement corresponding to the sample prefix statement into the suffix neural network model to obtain second feature data; taking the first feature data and the second feature data as an input of the data processing layer, taking the sample insertion words corresponding to the sample prefix statement and the sample suffix statement as an expected output of the data processing layer, training to obtain the neural network model.

In a second aspect, an embodiment of the disclosure provides a device for generating a statement. The device includes an obtaining unit, which is disposed to obtain an input statement by a user over a terminal; a determining unit, which is disposed to determine at least one target position in the input statement; wherein the at least one target position is a position for inserting a word; a generating unit, which is disposed to determine a statement to be inserted from the input statement according to a target position in the at least one target position, determine at least one candidate word to be inserted in the target position based on the statement to be inserted, and insert a candidate word in the at least one candidate word into the target position to obtain a candidate statement; and a sending unit, which is disposed to send the candidate statement to the terminal of the user for display.

In a third aspect, an embodiment of the disclosure provides a server. The server includes one or more processors and a storage device stored with one or more programs therein; and when the one or more programs are executed by the one or more processors, the one or more processors perform any method in the forgoing methods for separating words.

In a fourth aspect, an embodiment of the disclosure provides a computer readable medium, stored with a computer program therein. The computer program is executed by a processor to perform any method in the forgoing methods for separating words.

The method and the device for generating a statement provided by the embodiments of the disclosure determine at least one target position from input statements entered by the user, then determine the statement to be inserted respectively corresponding to each target position, then determine the candidate word respectively corresponding to each target position based on the determined statement to be inserted, insert the candidate word into the corresponding target position to generate the candidate statement, and finally send the obtained candidate statement to the terminal of the user for display, which can achieve to automatically insert words into the statement entered by the user. Compared with the statement input by the user acting as the prefix to complete the statement in the prior art, the embodiments in the disclosure can insert words into the statement input by the user to diversify manners to insert words. The generated candidate statement is sent to the terminal of the user for display, which can make candidate statements displayed on the terminal of the user more diversified to assist the user to select an expected statement from candidate statements, thereby saving time of the user spending on manually inserting words.

BRIEF DESCRIPTION OF THE DRAWINGS

According to the detailed description of unlimited embodiments with reference to figures as below, other features, objectives and advantages of the disclosure will be more obvious.

DETAILED DESCRIPTION

The disclosure will be further described in detail in combination with accompanying drawings and embodiments. It should be understood that specific embodiments described herein are only for the purpose of explanation of the relevant invention, rather than to limit the invention. It should also be noted that, for convenience of description, only portions related to the relevant invention are shown in the accompanying drawings.

It should be noted that, in the case of no conflict, the embodiments of the disclosure and features of the embodiments can be combined with each other. The disclosure will be described in detail below with reference to the accompanying drawings in combination with the embodiments.

Figure 1:
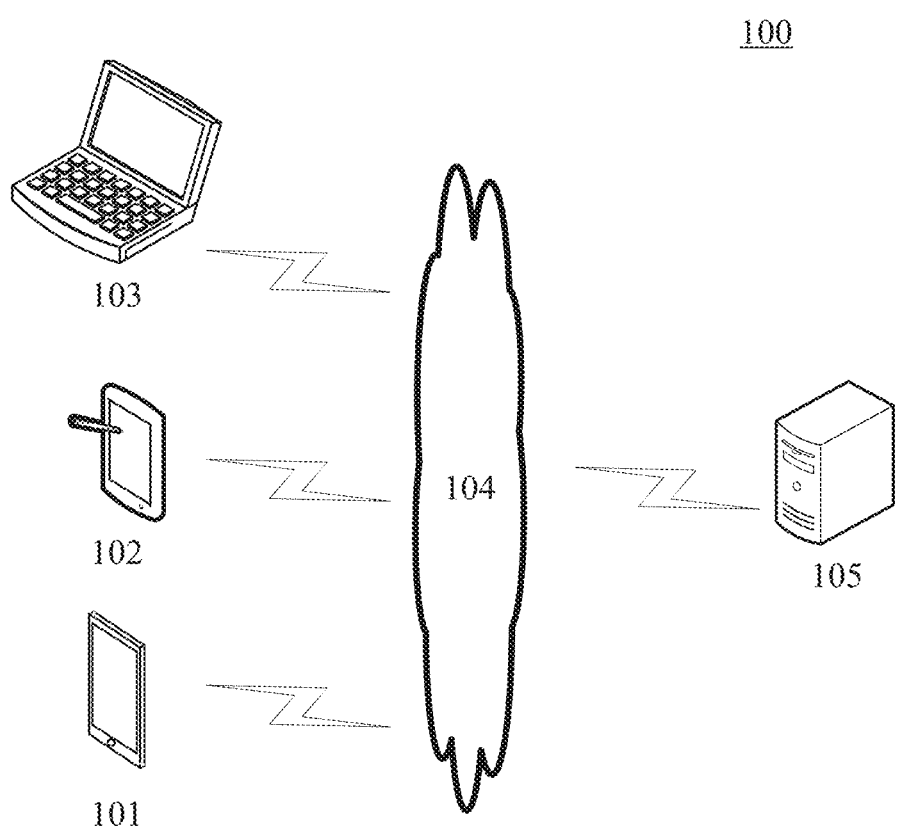
FIG. 1 is an exemplary system architecture diagram applied with an embodiment of the disclosure.

FIG. 1 shows an exemplary system architecture 100 able to employ a method for generating a statement or a device for generating a statement of an embodiment of the disclosure.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

The user can use the terminal equipment 101, 102 and 103 interact with the server 105 via the network 104 to receive or send messages. Various client applications, such as web browser applications, shopping applications, search applications, instant messaging tools, mailbox clients, and social platform software, can be installed in the terminal equipment 101, 102 and 103.

The terminal equipment 101, 102 and 103 may be hardware or software. When being hardware, the terminal equipment 101, 102 and 103 may be various kinds of electronic equipment capable of supporting image storage and image processing, including but not limited to smart phones, tablet personal computers, e-book readers, laptop portable computers, desk computers, etc. When being software, the terminal equipment 101, 102 and 103 can be installed in the electronic equipment listed above. The terminal equipment may be implemented as multiple pieces of software or software modules (such as multiple pieces of software or software modules used for providing distributed service), may also be implemented as a single piece of software or software module, which is not limited herein.

The server 105 may be the one for providing various services, such as a text processing server used for separating words sent by the terminal equipment 101, 102 and 103. The text processing server can process data such as a received text with words to be separated by analysis to obtain a processing result (such as a candidate statement).

The method for generating a statement provided by embodiments of the disclosure generally is executed by the server 105; correspondingly, the device for generating a statement generally is disposed in the server 105.

It should be noted that the server may be hardware or software. When being hardware, the server may be implemented as a distributed server cluster including a plurality of servers, and may also be implemented as the single server. When being software, the server may be implemented as multiple pieces of software or software modules (such as multiple pieces of software or software modules used for providing distributed service), and may also be implemented as a single piece of software or software module, which is not limited herein.

It should be understood that numbers of the terminal equipment, the network and the server in FIG. 1 are exemplary only. Any number of terminal equipment, networks and servers may be provided according to implementation requirements.

Figure 2:
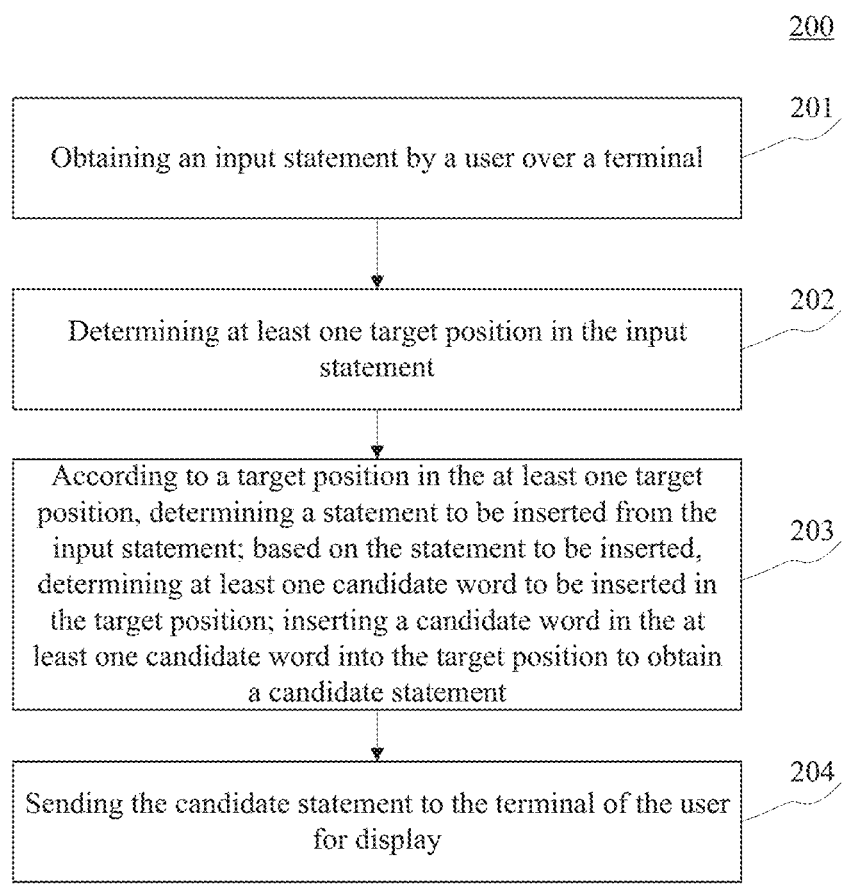
FIG. 2 is a flowchart of a method for generating a statement according to an embodiment of the disclosure.

Referring to FIG. 2, FIG. 2 shows a process 200 of a method for generating a statement according to an embodiment of the disclosure. The method for generating a statement includes following steps.

Step 201, an input statement entered by a user over a terminal is obtained.

In the embodiment, an executive body (as a server shown in FIG. 1) for generating a statement can obtain the input statement entered by the user from the terminal utilized by the user to input the statement (such as the terminal device shown in FIG. 1) in a wired connection manner or a wireless connection manner. Generally, an application capable of inputting a statement (i.e. a browser application, an instant messaging tool, etc.) can be installed in the terminal operated by the user. The executive body can provide content support to the application. The application can include a text input box (i.e. a search bar, a character input box on a chat window, etc.). When the user enters a statement into the text input box, the executive body can obtain the input statement entered by the user in real time.

Step 202, at least one target position is determined from the input statements.

In the embodiment, the executive body can determine at least one target position from the input statements. The target position is a position where to insert a word. Specifically, the executive body can determine at least one target position from the input statements according to various methods.

In some optional embodiments, the executive body can determine at least one target position from the input statements according to following steps.

In response to determining an end operation of a cursor movement aiming at the input statement, a current position of the cursor is determined to be the target position. The operation of a cursor movement can be an operation of the user moving the cursor within characters contained in the input statement by a device such as a mouse, a keyboard, a touch screen, etc. Generally, the terminal of the user can determine whether or not the operation of the cursor movement is over according to standing time of the cursor on each position within the input statement. As an example, when the standing time of the cursor on a position is longer than or equal to a given period, the terminal of the user sends information configured for indicating the end of operation of cursor movement and the current position of the cursor to the executive body. The executive body can determine the end of operation of cursor movement in response to the received information, and determine the current position of the cursor according to the information.

In some optional embodiments, the execute body can determine at least one target position from the input statements according to following steps.

First, words in the input statement are separated to obtain a word list. Specifically, the executive body can utilize various conventional methods of separating words (i.e. a dictionary based method of separating words, a statistics based method of separating words, a semantics based method of separating words, etc.) to separate words in the input statement.

Then, a position before the first word in the word list, a position after the last word in the word list, and a position between two adjacent words under the circumstance of the word list including at least two words are determined to be candidate positions. As an example, an input statement is supposed to be "how knowledge graph". The words in the input statement are separated to obtain a word list "how, knowledge, graph". The candidate positions are represented by the symbol "/", and the input statement containing candidate positions is indicated as "/how/knowledge/graph/".

Finally, at least one target position is determined from the determined candidate positions. As an example, the executive body can randomly select at least one (i.e. a predetermined number) target position from the determined candidate positions. Or each candidate position can be determined to be the target position.

In some optional embodiments, the executive body can follow steps as below to determine at least one target position from the candidate positions.

First, the word list is entered into a pre-trained position estimation module to obtain a probability value corresponding to each candidate position in the determined candidate positions. The probability value is configured for indicating a probability of inserting a word into a candidate position. The position estimation module is configured for indicating the correspondence of a word list and a probability value of a candidate position.

In common, the position estimation module can include a feature extraction portion and a classification portion. The feature extraction portion is configured for extracting a feature of the word list (features such as part of speech, word frequency, etc.). The classification portion is configured for analyze feature data to determine the probability value corresponding to each candidate position. The probability value is configured for a probability of inserting a word into the candidate position; the probability value is configured for indicating a probability of category to which the candidate position belong (i.e. a word can insert in the candidate position in the category). The feature extraction portion can include but not limited to at least one of following modules of: an N-Gram module, a recurrent neural network (RNN) module. Generally, when the N-Gram module is employed, a binary module and/or a ternary module can be adopted to obtain feature data. When the binary module and the ternary module are simultaneously used, it can utilize the classification portion to classify feature data output by the binary module and feature data output by the ternary module, respectively. Each candidate position can correspond to two probability values, and the maximal value of the two probability values is selected to be a probability value corresponding to the finally obtained candidate position. The classification portion can include but not limited to at least one of following modules configured for classification of: a support vector machine, a random forest, etc.

Then, at least one probability value is selected from the determined probability values according to a descending order, and the candidate position corresponding to at least one probability value can be determined as the target position. Specifically, the executive body can select a predetermined number (i.e. 2) of probability values from the determined probability values. Conceivably, when the number of candidate positions is smaller than or equal to a predetermined number, all the candidate positions can be determined as target positions.

In some optional embodiments, the position estimation module can be pre-trained by the executive body or other electronic devices following steps as below.

First, a first training sample set is obtained. Specifically, the executive body configured for training the position estimation module can obtain the first training sample set remotely or locally. The first training sample set includes a sample word list and positional label information marking a candidate position in the sample word list.

As an example, the sample word list can be a word list obtained after removing some word from the word list. The executive body configured for training the position estimation module separates words in a predetermined statement to obtain the word list. For instance, a word list "how, knowledge, graph" obtained by removing a word "construct" from a word list "how, construct, knowledge, graph" is determined as the sample word list.

The positional label information can be configured for indicating a position where needs a word inserted in. For instance, the sample word list "how, knowledge, graph" includes four candidate positions, which respectively are represented by A-D; positions in the sample word list are "A how B knowledge C graph D". Positional label information corresponding to the candidate position B can be a number 1, and positional label information corresponding to other candidate positions can be a number 0.

Then, a machine learning method is utilized to train an initial module to obtain the position estimation module by taking the sample word list included in a first training sample in the first training sample set as the input of the initial module and taking the positional label information respectively corresponding to words contained in the input sample word list as the expected output of the initial module.

Specifically, the executive body configured for training the position estimation module can utilize the machine learning method to train the initial module (i.e. including the N-Gram module configured for extracting a text feature, etc., and the support vector machine configured for classifying feature data representing a text feature) by taking the sample word list contained in the first training sample in the first training sample set as the input and taking the positional label information corresponding to the input sample word list as the expected output. Aiming at the sample word list input for each training, the actual output can be obtained. The actual output is a probability value of each candidate position actually output by the initial module. Then, the executive body configured for training the position estimation module can adopt the gradient descent and the back-propagation algorithm, based on the actual output and the expected output, to adjust parameters of the initial module, take the module obtained after adjusting parameters as the initial module for next training, and finish training in the circumstance of satisfying a predetermined condition to end training to obtain the position estimation module by training. The predetermined condition to end training can include but not limited to at least one of: training time exceeding a given period, training times exceeding a predetermined number, a loss value obtained by a predetermined loss function (i.e. the cross entropy loss function) smaller than a predetermined loss threshold.

Step 203, according to the target position in the at least one target position, a statement to be inserted is determined from the input statements; based on the determined statement to be inserted, at least one candidate word to be inserted in the target position is determined. The candidate word in the determined at least one candidate word is inserted in the target position to obtain the candidate statement.

In the embodiment, aiming at the target position in the at least one target position, the executive body can perform following steps.

Step 2031, according to the target position, a statement to be inserted is determined from the input statements.

The statement to be inserted is a statement determined to be inserted in an input statement. Specifically, the statement to be inserted can include a prefix statement and/or a suffix statement. As an example, it is supposed the target position is located between two adjacent words in the word list; a statement consisting of a word list before the target position is the prefix statement, and a statement consisting of a word list after the target position is the suffix statement. For instance, it is supposed that a word list is "how, knowledge, graph"; if the target position is a position between words "how" and "knowledge", "how" can be the prefix statement, and "knowledge graph" can be the suffix statement. For instance, if the target position is a position before the word "how", the statement to be inserted can only include the prefix statement "how knowledge graph".

Step 2032, based on the determined statement to be inserted, at least one candidate word to be inserted in the target position is determined.

Specifically, the executive body can utilize various methods to determine at least one candidate word to be inserted in the target position based on the determined statement to be inserted. As an example, the executive body can utilize a predetermined correspondence chart configured for indicating the corresponding relation of the statement to be inserted and the candidate word to determine at least one candidate word to be inserted in the target position. The correspondence chart can be disposed according to preliminary statistics of considerable statements to be inserted (i.e. prefix statements and suffix statements) and at least one candidate word corresponding to the statements to be inserted by a technician. The executive body can compare the determined statement to be inserted respectively with each statement to be inserted in the correspondence chart (i.e. similarities between determined statements), and determine at least one candidate word corresponding to a statement to be inserted matching the determined statement to be inserted (i.e. when the similarity is larger than or equal to a predetermined similarity threshold, determine two statements to be matched) as the candidate word to be inserted in the target position.

Step 2033, a candidate word in the determined at least one candidate word is inserted in the target position to obtain a candidate statement.

Specifically, the executive body can insert the candidate word in the determined at least one candidate word into the target position to obtain the candidate statement. As an example, it is supposed the input statement entered by a user is "how knowledge graph"; the target position is located between words "how" and "knowledge"; the determined candidate words include "to construct" and "to build"; the candidate statement can include "how to construct knowledge graph" and "how to build knowledge graph".

Step 204, the obtained candidate statement is sent to a terminal of a user for display.

In the embodiment, the executive body can send the obtained candidate statement to the terminal of the user for display. In common, the obtained candidate statement can display on the terminal of the user in a list. The user can select (i.e. by clicking or by a direction key) the candidate statement, thereby substituting the input statement by the candidate statement selected by the user. Candidate statements included in the list can be arranged according to a predetermined sequence, such as arrangement in a sequence of input hotspot of the candidate statements (i.e. times of entering the candidate statement by the user for searching or the numbers of users who browsed articles containing the candidate statement in last month), or random arrangement. In common, the arrangement sequence can be indicated by arrangement sequence information; for instance, the arrangement sequence information can be a number; number 1 is configured for indicating the arrangement according to input hotspot; number 2 is configured for random arrangement. The executive body can send the arrangement sequence information to the terminal of the user to enable the terminal of the user to display the candidate statements according to an arrangement sequence directed by the arrangement sequence information.

Figure 3:
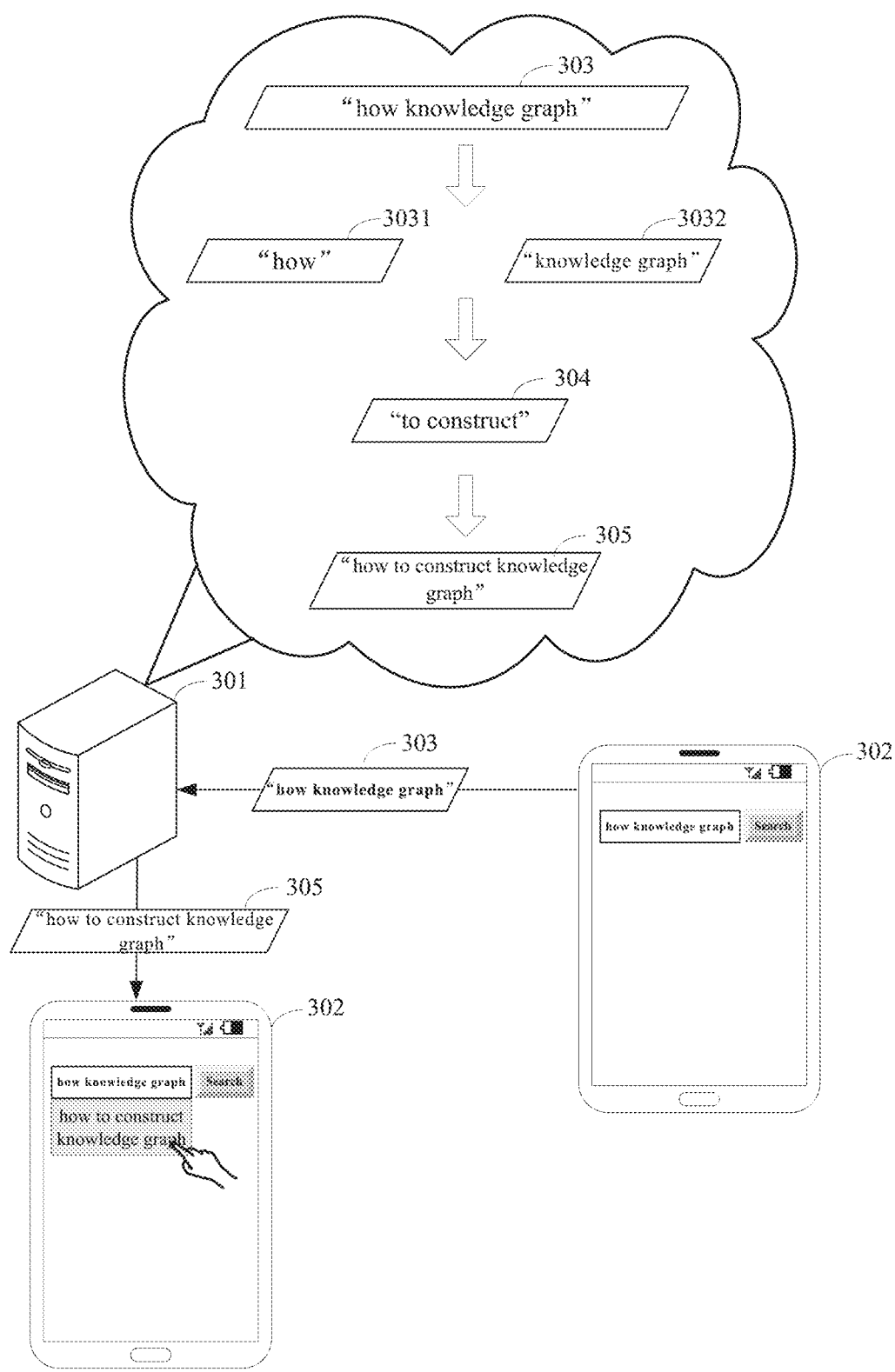
FIG. 3 is a schematic view of an application scenario of a method for generating a statement according to an embodiment of the disclosure.

Referring to FIG. 3, FIG. 3 is a schematic view of an application scenario of a method for generating a statement according to an embodiment of the disclosure. In the application scenario of FIG. 3, the server 301 first obtains an input statement 303 (i.e. "how knowledge graph") entered in a search bar/box displayed on a terminal 302 by the user from the terminal used by the user. Then, the server 301 determines a target position in the input statement 303 (i.e. a position between words "how" and "knowledge"). For instance, the server 301 can separate words in the input statement 303 to obtain a word list "how, knowledge, graph", then determine a position before the word "how", a position after "graph" and positions between adjacent positions as candidate positions, finally enter the word list into a pre-trained position estimation module to obtain a probability corresponding to each candidate position, and determine a candidate position corresponding to the maximal probability as the target position.

Then, the server 301 determines the statement to be inserted according to the target position. The statement to be inserted includes a prefix statement "how" (namely 3031 in the figure) and a suffix statement "knowledge graph" (namely 3032 in the figure).

Subsequently, the server 301 determines a candidate word 304 (i.e. a word "construct") to be inserted in the target position based on the determined statement to be inserted. For instance, the server 301 inputs the prefix statement 3031 and the suffix statement 3032 into the pre-trained neural network model to obtain the candidate word 304.

Then, the server 301 inserts the candidate 304 into the target position to obtain a candidate statement 305 (i.e. "how to construct knowledge graph").

Finally, the server 301 sends the obtained candidate statement 305 to the terminal 302 for display. The user can click the displayed candidate statement 305 to replace the input statement 303 by the candidate statement 305.

The method provided by the forgoing embodiments of the disclosure determines at least one target position from input statements entered by the user, then determines the statement to be inserted respectively corresponding to each target position, then determines the candidate word respectively corresponding to each target position based on the determined statement to be inserted, inserts the candidate word into the corresponding target position to generate the candidate statement, and finally sends the obtained candidate statement to the terminal of the user for display, which can achieve to automatically insert words into the statement entered by the user. Compared with the statement input by the user acting as the prefix to complete the statement in the prior art, the embodiments in the disclosure can insert words into the statement input by the user to diversify manners to insert words. The generated candidate statement is sent to the terminal of the user for display, which can make candidate statements displayed on the terminal of the user more diversified to assist the user to select an expected statement from candidate statements, thereby saving time of the user spending on manually inserting words.

Figure 4:
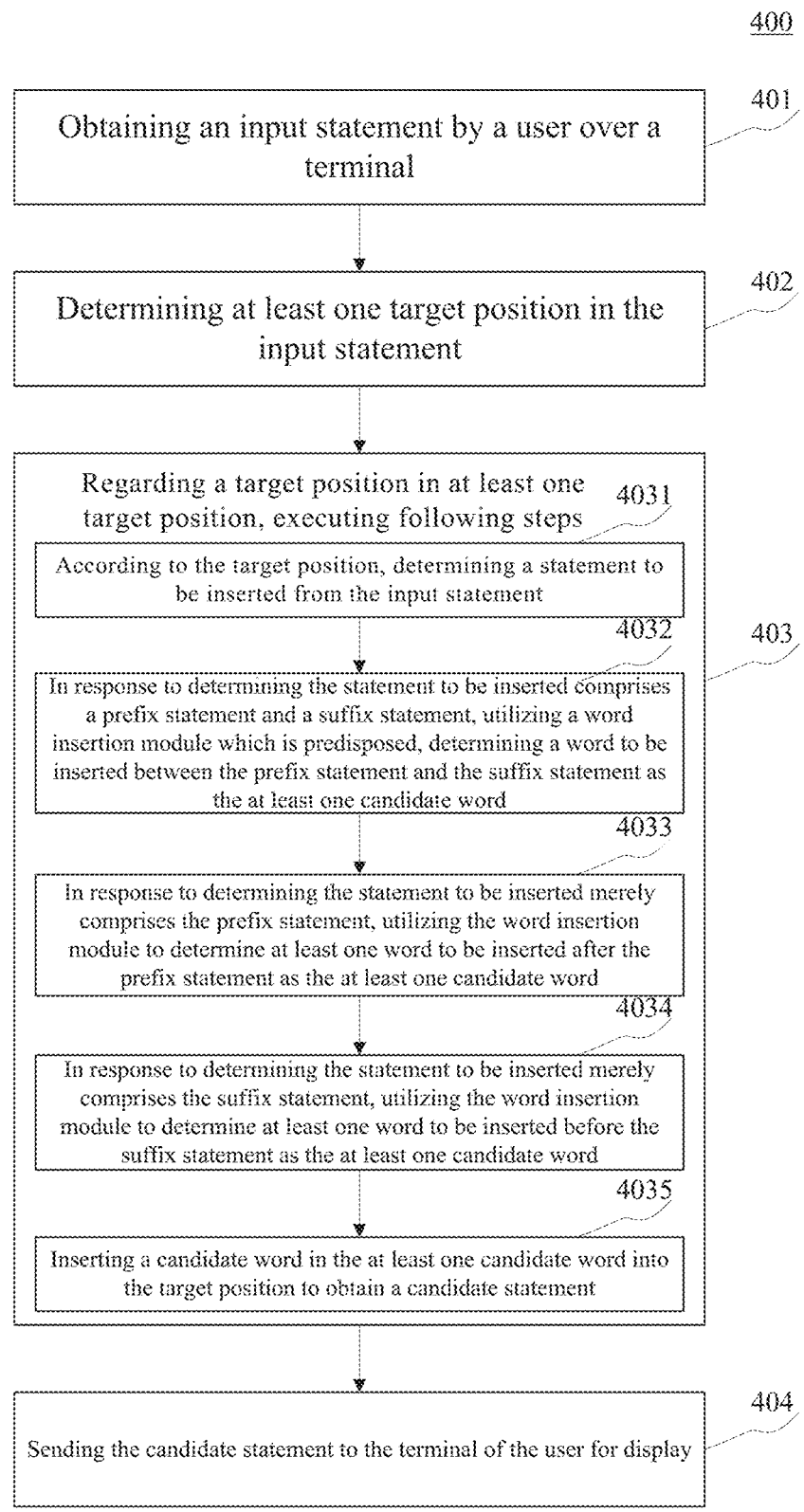
FIG. 4 is a flowchart of a method for generating a statement according to another embodiment of the disclosure.

Referring to FIG. 4, FIG. 4 is a process 400 of a method for generating a statement according to another embodiment of the disclosure. The process 400 of the method for generating a statement includes following steps.

Step 401, an input statement entered by a user over a terminal is obtained.

In the embodiment, step 401 is almost identical to step 201 in the embodiment corresponding to FIG. 2, which will not be repeated herein.

Step 402, at least one target position is determined from the input statements; the target position is a position to be inserted a word.

In the embodiment, step 402 is almost identical to step 202 in the embodiment corresponding to FIG. 2, which will not be repeated herein.

Step 403, according to a target position in the at least one target position, a statement to be inserted is determined from the input statements; in response to determining the statement to be inserted includes a prefix statement and a suffix statement, a predetermined word insertion module is utilized to determine a word to be inserted between the prefix statement and the suffix statement as a candidate word; in response to determining the statement to be inserted only includes the prefix statement, the word insertion module is utilized to determine at least one word to be inserted after the prefix statement as the candidate word; in response to determining the statement to be inserted only includes the suffix statement, the word insertion module is utilized to determine at least one word to be inserted before the suffix statement as the candidate word; the candidate word in the determined at least one candidate word is inserted in the target position to obtain the candidate statement.

In the embodiment, regarding the target position in the at least one target position, the executive body of the method for generating a statement (i.e. the server shown in FIG. 1) can execute following steps.

Step 4031, according to the target position, a statement to be inserted is determined from input statements.

Specifically, step 4031 is almost identical to step 2031 in the embodiment corresponding to FIG. 2, which will not be repeated herein.

Step 4032, in response to determining the statement to be inserted includes a prefix statement and a suffix statement, a predetermined word insertion module is utilized to determine a word to be inserted between the prefix statement and the suffix statement as a candidate statement.

Specifically, the statement to be inserted can include a prefix statement and/or a suffix statement. When the executive body determines the statement to be inserted includes a prefix statement and a suffix statement (namely the target position is located between two adjacent words), it can utilize the predetermined word insertion module to determine the word to be inserted between the prefix statement and the suffix statement as the candidate word.

The word insertion module is configured for indicating the corresponding relation of statements to be inserted and candidate words. The word insertion module can be modules in various forms.

Figure 5:
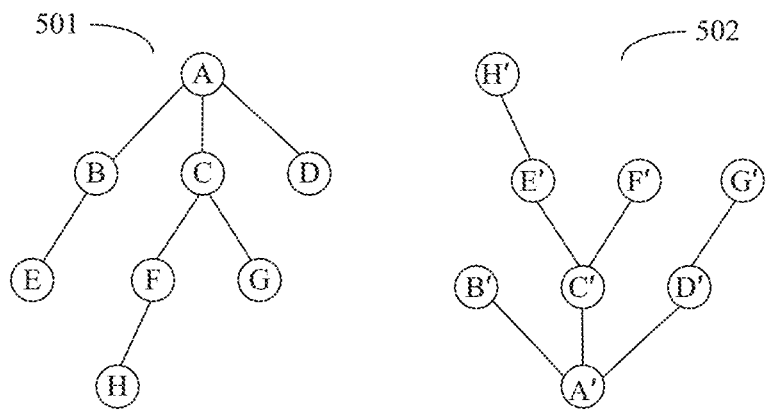
FIG. 5 is an exemplary schematic view of a forward Trie tree and a backward Trie tree of a method for generating a statement of an embodiment of the disclosure.

In some optional embodiments, the word insertion module is a pre-constructed bidirectional Trie tree. The bidirectional Trie tree includes a forward Trie tree and a backward Trie tree; the forward Trie tree is configured for determining a word to be inserted after the prefix statement according to the prefix statement, and the backward Trie tree is configured for determining a word to be inserted before the suffix statement according to the suffix statement. As shown in FIG. 5, FIG. 5 shows an exemplary schematic view of a forward Trie tree and a backward Trie tree. In FIG. 5, a forward Trie tree 501 includes nodes A-H, and a backward Trie tree 502 includes nodes A'-H'; the nodes included in the forward Trie tree 501 and the backward Trie tree 502 respectively correspond to different words; the line between each node is configured for indicating a sequence of words corresponding to the nodes. It is supposed words included in the prefix statement correspond to nodes A, C and F, respectively; it can determine a word corresponding to the node H is a word after the word corresponding to the node F to be inserted. It is supposed words included in the suffix statement correspond to nodes A', C' and E', respectively; it can determine a word corresponding to the node H' is a word before the word corresponding to the node E' to be inserted. As the construction process of the bidirectional Trie tree is simple, and considerable calculation is unnecessary in the process to utilize the bidirectional Trie tree to determine the candidate word, the bidirectional Trie tree can be utilized to enhance the efficiency of determining the candidate word.

The executive body can utilize the forgoing bidirectional Trie tree to determine a word to be inserted between the prefix statement and the suffix statement as the candidate word according to following steps.

First, a first word set consisting of words to be inserted after the prefix statement is determined, and a second word set consisting of words to be inserted before the suffix statement is determined. Specifically, the executive body can utilize the forgoing forward Trie tree to determine the first word set consisting of words to be inserted after the prefix statement, and utilize the forgoing backward Trie tree to determine the second word set consisting of words to be inserted before the suffix statement.

Then, words contained in the intersection of the first word set and the second word set are determined to be candidate words. As an example, it is supposed the prefix statement is "how"; the suffix statement is "knowledge graph"; the first word set includes words "treat", "construct" and "delete"; the second word set includes words "construct", "build" and "generate"; the candidate word is "construct".

In some optional embodiments, the bidirectional Trie tree is pre-constructed according to following steps.

First, a history input statement set is obtained. Specifically, the executive body configured for constructing the bidirectional Trie can obtain the history input statement set remotely or locally. The history input statement set can be a set of input statements entered by users contained in a target user group (i.e. a user group using some search application) in a history period (i.e. a period such as last month, last year, etc.).

Then, words in a history input statement in the history input statement set are separated to obtain a history input word list/sequence. Specifically, the executive body configured for constructing the bidirectional Trie tree can utilize a conventional method for separating words to separate words in the history input statement to obtain the history input word list.

Finally, the obtained history input word list is utilized to construct the bidirectional Trie tree. The bidirectional Trie tree includes nodes; the nodes correspond to words in the history input word list. In common, the nodes can be represented by structural bodies in various forms; for instance, a node can correspond to a structural body; the structural body can include a corresponding word and a cursor configured for indicating other nodes connected with the node.

In some optional embodiments, the word insertion module is a pre-trained neural network model. The neural network model includes a prefix neural network model, a suffix neural network model and a data processing layer. The prefix neural network model is configured for determining feature data of input prefix statements; the suffix neural network model is configured for determining feature data of input suffix statements; the data processing layer is configured for processing the determined feature data to obtain candidate words to be inserted in the target position. As the neural network model is a module obtained by pre-training considerable training samples, the neural network model can determine the candidate word more correctly.

Specifically, the prefix neural network model and the suffix neural network model can respectively include but not limited to at least one of: a long short-term memory (LSTM) module and an RNN module. Feature data output by the prefix neural network model and the suffix neural network model can be in a form of feature vectors or feature matrixes. The data processing layer can include a classifier configured for classification (i.e. a softmax classification function, a support vector machine, etc.), which is used for classifying feature data. The classifier can output at least one candidate word and a probability value corresponding to each candidate word. The probability value is configured for indicating a probability to insert a candidate word corresponding to the probability value into the target position. Namely, each candidate word can be configured for indicating a category, and the probability value can be configured for indicating a probability of an input statement to be inserted in a category represented by the candidate statement. The executive body can select at least one (i.e. a predetermined number) candidate word from the obtained candidate words to be a candidate word to be inserted in the target position according to a descending order of corresponding probability values.

In practice, when the statement to be inserted includes a prefix statement and a suffix statement, it can respectively input the prefix statement and the suffix statement into the prefix neural network model and the suffix neural network model. The prefix neural network model outputs first feature data; the suffix neural network model outputs second feature data. The data processing layer can join the first feature data and the second feature data (i.e. when the first feature data and the second feature data are feature vectors, it can combine the first feature data and the second feature data to be a vector; or it can select maximal values of elements in the same position of the first feature data and the second feature data to form a new feature vector as joined feature data), and analyze the joined feature data to obtain at least one candidate word and the probability value corresponding to each candidate word.

When the statement to be inserted only includes a prefix statement or a suffix statement (namely the target position is located before the first word in the word list, or located after the last word in the word list), it can input the prefix statement into the prefix neural network model, or input the suffix statement into the suffix neural network model. The data processing layer processes the first feature data output from the prefix neural network model or the second feature data output from the suffix neural network model to obtain at least one candidate word and the probability value corresponding to each candidate word.

In some optional embodiments, the neural network model can be pre-constructed by the executive body or other electronic devices according to following steps.

First, a second training sample set is obtained. Specifically, the executive body configured for training the neural network model can obtain the second training sample set remotely or locally. The second training sample set includes sample prefix statements and sample suffix statements, and sample insertion words predisposed to be inserted between the sample prefix statements and the sample suffix statements. As an example, a sample prefix statement is "how"; the corresponding sample suffix statement is "knowledge graph"; the corresponding sample insertion word is "construct".

Then, a machine learning method is utilized to input sample prefix statements contained in second training samples in the second training sample set into the prefix neural network model to obtain the first feature data, and input sample suffix statements corresponding to the entered sample prefix statements into the suffix neural network model to obtain the second feature data; taking the first feature data and the second feature data as the input of the data processing layer, taking sample insertion words corresponding to the entered sample prefix statements and sample suffix statements as the expected output of the data processing layer, it can train to obtain the neural network model.

Specifically, the executive body configured for training a neural network model can utilize the machine learning method to input sample prefix statements contained in second training samples in the second training sample set into the prefix neural network model contained in an initial module to obtain the first feature data, and input sample suffix statements corresponding to the sample prefix statements into the suffix neural network model contained in the initial module to obtain the second feature data; taking the first feature data and the second feature data as the input of the data processing layer, taking sample insertion words corresponding to the entered sample prefix statements and sample suffix statements as the expected output of the data processing layer, the initial module is trained, and aiming at the sample prefix statement and the sample suffix statement input for each training, the actual output can be obtained. The actual output (i.e. a probability value corresponding to the sample insertion word) is configured for indicating the word to be actually inserted between the sample prefix statement and the sample suffix statement. Then, the executive body configured for training the neural network model can adopt the gradient descent and the backpropagation algorithm, based on the actual output and the expected output (i.e. the expected output can correspond to a probability value 100%), to adjust parameters of the initial module, take the module obtained after adjusting parameters as the initial module for next training, and finish training in the circumstance of satisfying a predetermined condition to end training to obtain the neural network model by training. The predetermined condition to end training can include but not limited to at least one of: training time exceeding a given period, training times exceeding a predetermined number, a loss value obtained by a predetermined loss function (i.e. the cross entropy loss function) smaller than a predetermined loss threshold.

Step 4033, in response to determining the statement to be inserted only includes a prefix statement, a word insertion module is utilized to determine at least one word to be inserted after the prefix statement as the candidate word.

As an example, when the word insertion module is a bidirectional Trie tree, a forward Trie tree contained in the bidirectional Trie tree can be utilized to determine the candidate word to be inserted after the prefix statement. When the word insertion module is a neural network model, it can input the prefix statement into the neural network model; a prefix neural network model contained in the neural network model determines feature data of the prefix statement; the data processing layer contained in the neural network model processes the determined feature data to obtain the candidate word to be inserted after the prefix statement.

Step 4034, in response to determining the statement to be inserted only includes a suffix statement, the word insertion module is utilized to determine at least one word to be inserted before the suffix statement as the candidate word.

As an example, when the word insertion module is a bidirectional Trie tree, a backward Trie tree contained in the bidirectional Trie tree can be utilized to determine the candidate word to be inserted before the suffix statement. When the word insertion module is a neural network model, it can input the suffix statement into the neural network model; a suffix neural network model contained in the neural network model determines feature data of the suffix statement; the data processing layer contained in the neural network model processes the determined feature data to obtain the candidate word to be inserted before the suffix statement.

Step 4035, a candidate word in the determined at least one candidate word is inserted into the target position to obtain the candidate statement.

Specifically, step 4035 is almost identical to step 2033 in the embodiment corresponding to FIG. 2, which will not be repeated herein.

Step 404, the obtained candidate statement is sent to a terminal of a user for display.

In the embodiment, step 404 is almost identical to step 204 in the embodiment corresponding to FIG. 2, which will not be repeated herein.

It can be seen from FIG. 4 that the process 400 of the method for generating a statement in the embodiment emphasizes the step of using the word insertion module to determine the candidate word compared with the embodiment corresponding to FIG. 2. Therefore, the scheme described in the embodiment can determine the candidate word more accurately, which can further enhance the accuracy of the generated candidate statement, and make the candidate statement displayed on the terminal of the user more targeted; the possibility of selecting the expected statement to be input from the candidate statements by the user is further improved, which can further save the time spent on manually inserting words by the user.

Figure 6:
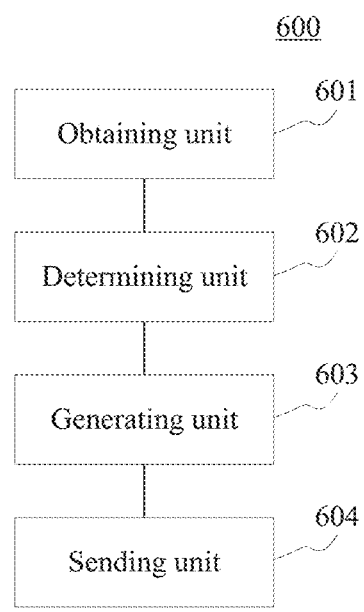
FIG. 6 is a structural schematic view of a device for generating a statement according to an embodiment of the disclosure.

Referring to FIG. 6, as the implement of the method shown in each figure, the disclosure provides an embodiment of a device for generating a statement; the device embodiment corresponds to the method embodiment shown in FIG. 2; the device specifically can be applied in various electronic devices.

As shown in FIG. 6, a device 600 for generating a statement of the embodiment includes an obtaining unit 601, which is disposed to obtain an input statement by a user over a terminal; a determining unit 602, which is disposed to determine at least one target position in the input statement; wherein the at least one target position is a position for inserting a word; a generating unit 603, which is disposed to determine a statement to be inserted from the input statement according to a target position in the at least one target position, determine at least one candidate word to be inserted in the target position based on the statement to be inserted, and insert a candidate word in the at least one candidate word into the target position to obtain a candidate statement; and a sending unit 604, which is disposed to send the candidate statement to the terminal of the user for display.

In the embodiment, the obtaining unit 601 can obtain the input statement entered by the user from the terminal utilized by the user to input the statement (such as the terminal device shown in FIG. 1) in a wired connection manner or a wireless connection manner. Generally, an application capable of inputting a statement (i.e. a browser application, an instant messaging tool, etc.) can be installed in the terminal operated by the user. The obtaining unit 601 can provide content support to the application. The application can include a text input box (i.e. a search bar, a character input box on a chat window, etc.). When the user enters a statement into the text input box, the obtaining unit 601 can obtain the input statement entered by the user.

In the embodiment, the determining unit 602 can determine at least one target position from the input statements. The target position is a position where to insert a word. Specifically, the determining unit 602 can determine at least one target position from the input statements according to various methods, which can be referred to optional manners as below.

In the embodiment, aiming at the target position in the at least one target position, the generating unit 603 can execute following steps.

Step 6031, according to the target position, a statement to be inserted is determined from the input statements.

Specifically, the statement to be inserted can include a prefix statement and/or a suffix statement. As an example, it is supposed the target position is located between two adjacent words in the word list; a statement consisting of a word list before the target position is the prefix statement, and a statement consisting of a word list after the target position is the suffix statement. For instance, it is supposed that a word list is "how, knowledge, graph"; if the target position is a position between words "how" and "knowledge", "how" can be the prefix statement, and "knowledge graph" can be the suffix statement. For instance, if the target position is a position before the word "how", the statement to be inserted can only include the prefix statement "how knowledge graph".

Step 6032, based on the determined statement to be inserted, at least one candidate word to be inserted in the target position is determined.

Specifically, the generating unit 603 can utilize various methods to determine at least one candidate word to be inserted in the target position based on the determined statement to be inserted. As an example, the generating unit 603 can utilize a predetermined correspondence chart configured for indicating the corresponding relation of the statement to be inserted and the candidate word to determine at least one candidate word to be inserted in the target position. The correspondence chart can be disposed according to preliminary statistics of considerable statements to be inserted (i.e. prefix statements and suffix statements) and at least one candidate word corresponding to the statements to be inserted by a technician. The generating unit 603 can compare the determined statement to be inserted respectively with each statement to be inserted in the correspondence chart (i.e. similarities between determined statements), and determine at least one candidate word corresponding to a statement to be inserted matching the determined statement to be inserted (i.e. when the similarity is larger than or equal to a predetermined similarity threshold, determine two statements to be matched) as the candidate word to be inserted in the target position.

Step 6033, a candidate word in the determined at least one candidate word is inserted in the target position to obtain a candidate statement.

Specifically, the generating unit 603 can insert the candidate word in the determined at least one candidate word into the target position to obtain the candidate statement. As an example, it is supposed the input statement entered by a user is "how knowledge graph"; the target position is located between words "how" and "knowledge"; the determined candidate words include "to construct" and "to build"; the candidate statement can include "how to construct knowledge graph" and "how to build knowledge graph".

In the embodiment, the sending unit 604 can send the obtained candidate statement to the terminal of the user for display. In common, the obtained candidate statement can display on the terminal of the user in a list. The user can select (i.e. by clicking or by a direction key) the candidate statement, thereby substituting the input statement by the candidate statement selected by the user. Candidate statements included in the list can be arranged according to a predetermined sequence, such as arrangement in a sequence of input hotspot of the candidate statements (i.e. times of entering the candidate statement by the user for searching or the numbers of users who browsed articles containing the candidate statement in last month), or random arrangement. In common, the arrangement sequence can be indicated by arrangement sequence information; for instance, the arrangement sequence information can be a number; number 1 is configured for indicating the arrangement according to input hotspot; number 2 is configured for random arrangement. The executive body can send the arrangement sequence information to the terminal of the user to enable the terminal of the user to display the candidate statements according to an arrangement sequence directed by the arrangement sequence information.

In some optional embodiments, the determining unit 602 can include a word separating module (not shown), which is disposed to separate words in an input statement to obtain a word list; a first determining module (not shown), which is disposed to determine a position before a first word in the word list, a position after a last word in the word list, and a position between adjacent words in a circumstance of the word list comprising at least two words as candidate positions; and a second determining module (not shown), which is disposed to determine at least one target position from the candidate positions.

In some optional embodiments, the second determining unit can include: a generating submodule (not shown), which is disposed to input the word list into a position estimation module which is pre-trained to obtain a probability value corresponding to each of the candidate positions; and a first determining submodule (not shown), which is disposed to select at least one probability value in a descending order from probability values, and determine a candidate position corresponding to the at least one probability value as the target position; the probability value is configured for indicating a probability to insert a word into the candidate positions.

In some optional embodiments, the position estimation module can be pre-obtained by training based on follow steps of: obtaining a first training sample set; wherein the first training sample set comprises a sample word list and position label information to mark a candidate position in the sample word list; and utilizing a machine learning method, taking the sample word list comprised in first training samples in the first training sample set as an input of an initial module, taking the position label information respectively corresponding to words comprised in the sample word list as an expected output of the initial module, training the initial module to obtain the position estimation module.

In some optional embodiments, the determining unit 602 can further be disposed to: in response to determining an end operation of a cursor movement aiming at the input statement, determine a current position of a cursor as the target position.

In some optional embodiments, the generating unit 603 can include: a third determining module (not shown), which is disposed to in response to determining the statement to be inserted comprises a prefix statement and a suffix statement, utilize a word insertion module which is predisposed, determine a word to be inserted between the prefix statement and the suffix statement as the at least one candidate word; a fourth determining module (not shown), which is disposed to in response to determining the statement to be inserted merely comprises the prefix statement, utilize the word insertion module to determine at least one word to be inserted after the prefix statement as the at least one candidate word; and a fifth determining module (not shown), which is disposed to in response to determining the statement to be inserted merely comprises the suffix statement, utilize the word insertion module to determine at least one word to be inserted before the suffix statement as the at least one candidate word.

In some optional embodiments, the word insertion module is a bidirectional Trie tree which is pre-constructed; the bidirectional Trie tree comprises a forward Trie tree and a backward Trie tree; the forward Trie tree is configured for determining a word to be inserted after the prefix statement based on the prefix statement; the backward Trie tree is configured for determining a word to be inserted before the suffix statement based on the suffix statement; and the third determining module includes: a second determining submodule (not shown), which is disposed to determine a first word set consisting of the at least one word to be inserted after the prefix statement, and determine a second word set consisting of the at least one word to be inserted before the suffix statement; a third determining submodule (not shown), which is disposed to determine words comprised in an intersection of the first word set and the second word set as the at least one candidate word.

In some optional embodiments, the bidirectional Trie tree can be pre-constructed based on following steps of: obtaining a history input statement set; separating words in a history input statement in the history input statement set to obtain a history input word list; and utilizing the history input word list to construct the bidirectional Trie tree; the bidirectional Trie tree comprises nodes, and the nodes correspond to words in the history input word list.

In some optional embodiments, the word insertion module is a neural network model which is pre-trained; the neural network model comprises a prefix neural network model, a suffix neural network model and a data processing layer; the prefix neural network model is configured for determining feature data of the prefix statement; the suffix neural network model is configured for determining feature data of the suffix statement; the data processing layer is configured for processing the feature data to obtain the at least one candidate word to be inserted into the at least one target position.

In some optional embodiments, the neural network model is pre-constructed based on following steps of: obtaining a second training sample set; wherein the second training sample set comprises a sample prefix statement and a sample suffix statement, and a sample insertion word predisposed to be inserted between the sample prefix statement and the sample suffix statement; utilizing a machine learning method, inputting the sample prefix statement comprised in second training samples in the second training sample set into the prefix neural network model to obtain first feature data, and inputting the sample suffix statement corresponding to the sample prefix statement into the suffix neural network model to obtain second feature data; taking the first feature data and the second feature data as an input of the data processing layer, taking the sample insertion words corresponding to the sample prefix statement and the sample suffix statement as an expected output of the data processing layer, training to obtain the neural network model.

The device provided by the forgoing embodiments of the disclosure determines at least one target position from input statements entered by the user, then determines the statement to be inserted respectively corresponding to each target position, then determines the candidate word respectively corresponding to each target position based on the determined statement to be inserted, inserts the candidate word into the corresponding target position to generate the candidate statement, and finally sends the obtained candidate statement to the terminal of the user for display, which can achieve to automatically insert words into the statement entered by the user. Compared with the statement input by the user acting as the prefix to complete the statement in the prior art, the embodiments in the disclosure can insert words into the statement input by the user to diversify manners to insert words. The generated candidate statement is sent to the terminal of the user for display, which can make candidate statements displayed on the terminal of the user more diversified to assist the user to select an expected statement from candidate statements, thereby saving time of the user spending on manually inserting words.

Figure 7:
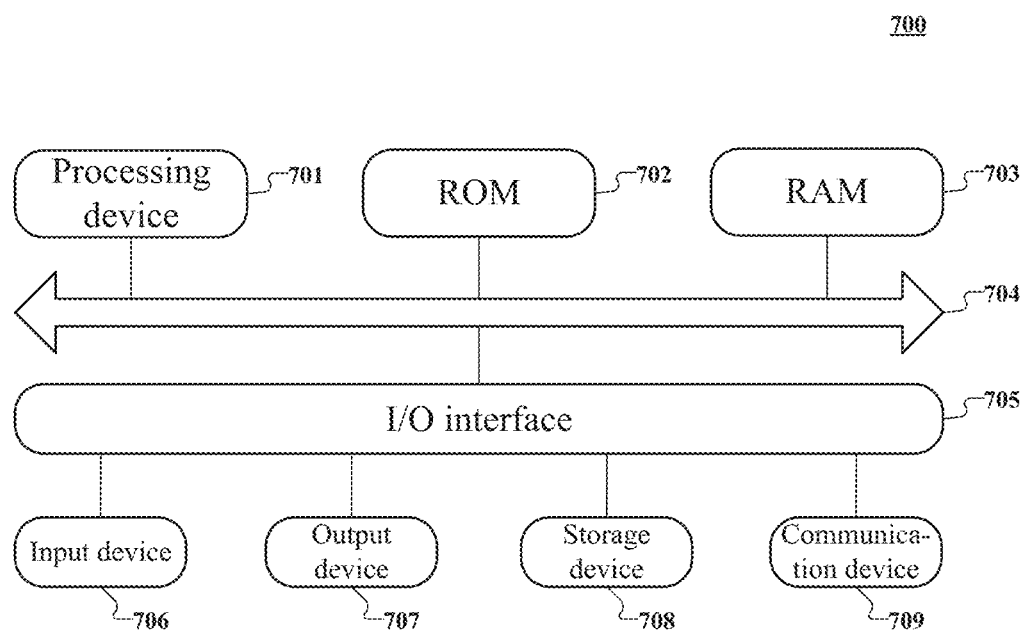
FIG. 7 is a structural schematic view of a server adapted for implementing an embodiment of the disclosure.

Reference is now made to FIG. 7 which shows a structure diagram of a server 700 applicable to implementing an embodiment of the disclosure. The server shown in FIG. 7 is merely an example and should not pose any limitation on functions and application ranges of the embodiments of the disclosure.

As shown in FIG. 7, the server 700 includes a processing device 701 which can execute various appropriate actions and processes according to programs stored in a read-only memory (ROM) 702 or programs loaded to a random-access memory (RAM) 703 from a storage device 708. Various programs and data required by operation of the system 600 are also stored in the RAM 703. The CPU 701, ROM 702 and RAM 703 are connected to one another through a bus 704. An input/output (I/O) interface 705 is also connected to the bus 704.

The I/O interface 705 is connected with following components: an input device 706 including a keyboard, a mouse, etc.; an output device 707 including a cathode-ray tube (CRT), a liquid crystal display (LCD), a loudspeaker, etc.; a storage device 708 including a hard disk, etc.; and a communication device 709. The communication device 709 may allow the server 700 to communicate wirelessly or wirelessly with other devices to exchange data. Although FIG. 7 shows a server 700 with various devices, it should be understood that not all of the illustrated devices are required to be implemented or have. More or less devices may be implemented or have been provided in an alternative manner. Each block shown in FIG. 7 may represent one device or multiple devices as required.

Specifically, processes described above with reference to flowcharts may be implemented as computer software programs in accordance with embodiments of the present disclosure. For example, an embodiment of the disclosure comprises a computer program product which comprises a computer program carried on a computer readable medium, and the computer program comprises program codes used for executing the method shown in the flowchart. In such embodiment, the computer program may be downloaded from the network through the communication device 709 and installed, and/or downloaded from the storage device 708 and installed, or installed from ROM 702. When the computer program is executed by the processing device 701, a function defined in the method provided by the disclosure is executed.

It should be noted that the computer readable medium of the disclosure may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above.

In the disclosure, the computer readable storage medium may be any tangible medium that contains or stores a program that can be used by or in combination with an instruction execution system, apparatus, or device. In the disclosure, a computer readable signal medium may include a data signal propagating in a baseband or as a part of a carrier wave, and computer readable program codes are carried in the data signal. Such propagated data signal may be in various forms, including but not limited to an electro-magnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The computer readable medium may be included in the server, or may also present separately without being assembled into the server. The above computer readable medium carries one or more programs. When one or more programs above are executed by the server, the server is enabled to obtain an input statement by a user over a terminal; determine at least one target position in the input statement; according to a target position in the at least one target position, determine a statement to be inserted from the input statement; based on the statement to be inserted, determine at least one candidate word to be inserted in the target position; insert a candidate word in the at least one candidate word into the target position to obtain a candidate statement; and send the candidate statement to the terminal of the user for display. The at least one target position is a position for inserting a word.

The computer program codes for carrying out operation of the present application may be written by one or more programming languages, or a combination thereof, the programming languages include object oriented programming languages, such as Java, Smalltalk, C++, as well as conventional procedural programming languages, such as a "C" language or similar programming languages. The program codes may be executed entirely on a user computer, or partly on the user computer, or as a separate software package, or partly on the user computer and partly on a remote computer, or entirely on the remote computer or the server. In situations involving the remote computer, the remote computer may be connected to the user computer through any kind of network, including a local area network (LAN) or a wide area network (WAN), or may be connected to an external computer (for example through the Internet by virtue of an Internet service provider).

The flowcharts and block diagrams in the figures illustrate the possible system architecture, functions, and operation of systems, methods, and computer program products according to various embodiments of the disclosure. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the disclosure may be implemented in a software mode or in a hardware mode. The described units may also be arranged in a processor, for example, the units can be described as follows: a processor includes an obtaining unit, a determining unit, a generating unit and a sending unit, and the names of the units do not, in some cases, constitute limitation on the units themselves. For instance, the obtaining unit can further be described as a unit for obtaining an input statement by a user over a terminal.

The above description is merely the illustration of preferred embodiments of the disclosure and the technical principles used. It should be understood by those skilled in the art that the scope of the disclosure referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the disclosure.

What is claimed is:

1. A method for generating a statement, comprising:
    obtaining an input statement by a user over a terminal;
    determining at least one target position in the input statement; wherein the at least one target position is a position for inserting a word;
    according to a target position in the at least one target position, determining a statement to be inserted from the input statement; based on the statement to be inserted, determining at least one candidate word to be inserted in the target position; inserting a candidate word in the at least one candidate word into the target position to obtain a candidate statement;
    sending the candidate statement to the terminal of the user for display;
    wherein the based on the statement to be inserted, determining at least one candidate word to be inserted in the target position further comprises:
    in response to determining the statement to be inserted comprises a prefix statement and a suffix statement, utilizing a word insertion module which is predisposed, determining a word to be inserted between the prefix statement and the suffix statement as the at least one candidate word;
    in response to determining the statement to be inserted merely comprises the prefix statement, utilizing the word insertion module to determine at least one word to be inserted after the prefix statement as the at least one candidate word; and
    in response to determining the statement to be inserted merely comprises the suffix statement, utilizing the word insertion module to determine at least one word to be inserted before the suffix statement as the at least one candidate word.

2. The method according to claim 1, wherein the determining at least one target position in the input statement comprises:
    separating words in the input statement to obtain a word list;
    determining a position before a first word in the word list, a position after a last word in the word list, and a position between adjacent words in a circumstance of the word list comprising at least two words as candidate positions; and
    determining at least one target position from the candidate positions.

3. The method according to claim 2, wherein the determining at least one target position from the candidate positions comprises:
    inputting the word list into a position estimation module which is pre-trained to obtain a probability value corresponding to each of the candidate positions; wherein the probability value is configured for indicating a probability to insert a word into the candidate positions; and
    selecting at least one probability value in a descending order from probability values, and determining a candidate position corresponding to the at least one probability value as the target position.

4. The method according to claim 3, wherein the position estimation module is pre-obtained by training based on:
    obtaining a first training sample set; wherein the first training sample set comprises a sample word list and position label information to mark a candidate position in the sample word list; and
    utilizing a machine learning method, taking the sample word list comprised in first training samples in the first training sample set as an input of an initial module, taking the position label information respectively corresponding to words comprised in the sample word list as an expected output of the initial module, training the initial module to obtain the position estimation module.

5. The method according to claim 1, wherein the determining at least one target position in the input statement comprises:
    in response to determining an end operation of a cursor movement aiming at the input statement, determining a current position of a cursor as the target position.

6. The method according to claim 1, wherein the word insertion module is a bidirectional Trie tree which is pre-constructed; wherein the bidirectional Trie tree comprises a forward Trie tree and a backward Trie tree; the forward Trie tree is configured for determining a word to be inserted after the prefix statement based on the prefix statement; the backward Trie tree is configured for determining a word to be inserted before the suffix statement based on the suffix statement; and
    wherein the determining a word to be inserted between the prefix statement and the suffix statement as the at least one candidate word comprises:
    determining a first word set consisting of the at least one word to be inserted after the prefix statement, and determining a second word set consisting of the at least one word to be inserted before the suffix statement; and
    determining words comprised in an intersection of the first word set and the second word set as the at least one candidate word.

7. The method according to claim 6, wherein the bidirectional Trie tree is pre-constructed based on:
    obtaining a history input statement set;
    separating words in a history input statement in the history input statement set to obtain a history input word list; and
    utilizing the history input word list to construct the bidirectional Trie tree; wherein the bidirectional Trie tree comprises nodes, and the nodes correspond to words in the history input word list.

8. The method according to claim 1, wherein the word insertion module is a neural network model which is pre-trained; the neural network model comprises a prefix neural network model, a suffix neural network model and a data processing layer; the prefix neural network model is configured for determining feature data of the prefix statement; the suffix neural network model is configured for determining feature data of the suffix statement; the data processing layer is configured fix processing the feature data to obtain the at least one candidate word to be inserted into the at least one target position.

9. The method according to claim 8, wherein the neural network model is pre-constructed based on:
obtaining a second training sample set; wherein the second training sample set comprises a sample prefix statement and a sample suffix statement, and a sample insertion word predisposed to be inserted between the sample prefix statement and the sample suffix statement;
utilizing a machine learning method, inputting the sample prefix statement comprised in second training samples in the second training sample set into the prefix neural network model to obtain first feature data, and inputting the sample suffix statement corresponding to the sample prefix statement into the suffix neural network model to obtain second feature data; taking the first feature data and the second feature data as an input of the data processing layer, taking the sample insertion words corresponding to the sample prefix statement mid the sample suffix statement as an expected output of the data processing layer, training to obtain the neural network model.

10. A server, comprising:
one or more processors;
a storage device, stored with one or more programs therein; and
when the one or more programs are executed by the one or more processors, enabling the one or more processors to perform:
obtaining an input statement by a user over a terminal;
determining at least one target position in the input statement;
wherein the at least one target position is a position for inserting a word;
according to a target position in the at least one target position, determining a statement to be inserted from the input statement; based on the statement to be inserted, determining at least one candidate word to be inserted in the target position; inserting a candidate word in the at least one candidate word into the target position to obtain a candidate statement;
sending the candidate statement to the terminal of the user for display;
wherein the storage device further stores the one or more programs that upon execution by the one or more processors cause the server to:
in response to determining the statement to be inserted comprises a prefix statement and a suffix statement, utilize a word insertion module which is predisposed, determine a word to be inserted between the prefix statement and the suffix statement as the at least one candidate word;
in response to determining the statement to be inserted merely comprises the prefix statement, utilize the word insertion module to determine at least one word to be inserted after the prefix statement as the at least one candidate word; and
in response to determining the statement to be inserted merely comprises the suffix statement, utilize the word insertion module to determine at least one word to be inserted before the suffix statement as the at least one candidate word.

11. The server according to claim 10, wherein the storage device further stores the one or more programs that upon execution by the one or more processors cause the server to:
separate words in the input statement to obtain a word list;
determine a position before a first word in the word list, a position after a last word in the word list, and a position between adjacent words in a circumstance of the word list comprising at least two words as candidate positions; and
determine at least one target position from the candidate positions.

12. The server according to claim 11, wherein the storage device further stores the one or more programs that upon execution by the one or more processors cause the server to:
input the word list into a position estimation module which is pre-trained to obtain a probability value corresponding to each of the candidate positions; wherein the probability value is configured for indicating a probability to insert a word into the candidate positions; and
select at least one probability value in a descending order from probability values, and determine a candidate position corresponding to the at least one probability value as the target position.

13. The server according to claim 12, wherein the position estimation module is pre-obtained by training based on:
obtaining a first training sample set; wherein the first training sample set comprises a sample word list and position label information to mark a candidate position in the sample word list; and
utilizing a machine learning method, taking the sample word list comprised in first training samples in the first training sample set as an input of an initial module, taking the position label information respectively corresponding to words comprised in the sample word list as an expected output of the initial module, training the initial module to obtain the position estimation module.

14. The server according to claim 10, wherein the storage device further stores the one or more programs that upon execution by the one or more processors cause the server to:
in response to determining an end operation of a cursor movement aiming at the input statement, determine a current position of a cursor as the target position.

15. The server according to claim 10, wherein the word insertion module is a bidirectional Trie tree which is pre-constructed; wherein the bidirectional Trie tree comprises a forward Trie tree and a backward Trie tree; the forward Trie tree is configured for determining a word to be inserted after the prefix statement based on the prefix statement; the backward Trie tree is configured for determining a word to be inserted before the suffix statement based on the suffix statement; and
wherein the storage device further stores the one or more programs that upon execution by the one or more processors cause the server to:
determine a first word set consisting of the at least one word to be inserted after the prefix statement, and determine a second word set consisting of the at least one word to be inserted before the suffix statement; and
determine words comprised in an intersection of the first word set and the second word set as the at least one candidate word.

16. The server according to claim 15, wherein the bidirectional Trie tree is pre-constructed based on:

obtaining a history input statement set;

separating words in a history input statement in the history input statement set to obtain a history input word list; and utilizing the history input word list to construct the bidirectional Trie tree; wherein the bidirectional Trie tree comprises nodes, and the nodes correspond to words in the history input word list.

17. The server according to claim 10, wherein the word insertion module is a neural network model which is pre-trained; the neural network model comprises a prefix neural network model, a suffix neural network model and a data processing layer; the prefix neural network model is configured for determining feature data of the prefix statement; the suffix neural network model is configured for determining feature data of the suffix statement; the data processing layer is configured for processing the feature data to obtain the at least one candidate word to be inserted into the at least one target position.

18. The server according to claim 17, wherein the neural network model is pre-constructed based on:

obtaining a second training sample set; wherein the second training sample set comprises a sample prefix statement and a sample suffix statement, and a sample insertion word predisposed to be inserted between the sample prefix statement and the sample suffix statement;

utilizing a machine learning method, inputting the sample prefix statement comprised in second training samples in the second training sample set into the prefix neural network model to obtain first feature data, and inputting the sample suffix statement corresponding to the sample prefix statement into the suffix neural network model to obtain second feature data; taking the first feature data and the second feature data as an input of the data processing layer, taking the sample insertion words corresponding to the sample prefix statement and the sample suffix statement as an expected output of the data processing layer, training to obtain the neural network model.

* * * * *